United States Patent
Heathman et al.

(10) Patent No.: US 6,762,156 B2
(45) Date of Patent: Jul. 13, 2004

(54) REACTIVE CEMENT COMPOSITIONS FOR SEALING HYDROCARBON CONTAINING SUBTERRANEAN ZONES AND METHODS

(75) Inventors: James F. Heathman, Katy, TX (US); Sears T. Dealy, Comanche, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 186 days.

(21) Appl. No.: 10/061,083

(22) Filed: Jan. 31, 2002

(65) Prior Publication Data

US 2003/0144374 A1 Jul. 31, 2003

(51) Int. Cl.$^7$ .............................. C09K 7/02; E21B 33/13
(52) U.S. Cl. ................ 507/211; 166/293; 166/295; 507/269; 507/277; 507/901; 106/607; 106/632
(58) Field of Search ................................. 166/293, 295; 507/211, 269, 277, 901; 106/607, 632

(56) References Cited

U.S. PATENT DOCUMENTS

| | | | |
|---|---|---|---|
| 3,724,564 A | 4/1973 | Messenger | 175/72 |
| 4,173,999 A | 11/1979 | Messenger | 166/293 |
| 4,397,354 A | 8/1983 | Dawson et al. | 166/294 |
| 4,442,241 A | 4/1984 | Drake et al. | 523/130 |
| 4,503,170 A | 3/1985 | Drake et al. | 523/130 |
| 4,566,977 A | 1/1986 | Hatfield | 252/8.5 C |
| 4,633,950 A | 1/1987 | Delhommer et al. | 166/295 |
| 4,643,255 A | 2/1987 | Sandiford et al. | 166/295 |
| 4,687,516 A * | 8/1987 | Burkhalter et al. | 106/719 |
| 5,151,131 A * | 9/1992 | Burkhalter et al. | 106/822 |
| 5,333,690 A * | 8/1994 | Nahm et al. | 166/291 |
| 5,370,185 A * | 12/1994 | Cowan et al. | 166/293 |
| 5,389,145 A * | 2/1995 | Gupta et al. | 106/807 |
| 5,476,142 A | 12/1995 | Kajita | 166/294 |
| 5,553,670 A * | 9/1996 | Cowan | 166/293 |
| 5,629,270 A | 5/1997 | Van Slyke et al. | 507/125 |
| 5,683,503 A | 11/1997 | Montgomery | 106/804 |
| 5,688,844 A | 11/1997 | Chatterji et al. | 524/8 |
| 5,795,924 A | 8/1998 | Chatterji et al. | 523/130 |
| 5,820,670 A | 10/1998 | Chatterji et al. | 106/727 |
| 5,913,364 A | 6/1999 | Sweatman | 166/281 |
| 5,972,103 A | 10/1999 | Mehta et al. | 106/728 |
| 6,060,434 A | 5/2000 | Sweatman et al. | 166/281 |
| 6,093,241 A * | 7/2000 | Alther | 106/719 |
| 6,167,967 B1 | 1/2001 | Sweatman | 166/281 |
| 6,258,757 B1 | 7/2001 | Sweatman et al. | 507/21.9 |

FOREIGN PATENT DOCUMENTS

| | | | |
|---|---|---|---|
| EP | 0 280 341 A1 | 1/1988 | E21B/43/26 |
| EP | 0 875 658 A2 | 11/1998 | E21B/33/138 |
| GB | 2 108 175 A | 11/1981 | C09K/7/06 |
| WO | WO 81/00874 | 4/1981 | E21B/21/12 |
| WO | WO 96/00762 | 1/1996 | C09K/7/06 |

* cited by examiner

Primary Examiner—Philip C. Tucker
(74) Attorney, Agent, or Firm—Craig W. Roddy; C. Clark Dougherty, Jr.

(57) ABSTRACT

The present invention provides improved reactive cement compositions for sealing hydrocarbon containing subterranean zones and methods of using the cement compositions. The sealing compositions are basically comprised of water, a hydraulic cement, an organophillic clay, a hydratable gelling agent and a water soluble alkaline source in effective amounts.

8 Claims, No Drawings

REACTIVE CEMENT COMPOSITIONS FOR SEALING HYDROCARBON CONTAINING SUBTERRANEAN ZONES AND METHODS

BACKGROUND OF THE INVENTION

1. Field of the Invention

The present invention relates to improved reactive cement compositions for sealing liquid hydrocarbon containing subterranean zones and methods of utilizing the compositions.

2. Description of the Prior Art

In the drilling of oil and gas wells using the rotary drilling method, drilling fluid is circulated through the drill string and drill bit and then back to the surface by way of the wellbore being drilled. The drilling fluid maintains hydrostatic pressure on the subterranean zones through which the wellbore is drilled and circulates cuttings out of the wellbore. As the wellbore is drilled, formations are encountered which may be too weak to support the hydrostatic pressure of the drilling fluid column, or they have large natural fractures, vugs, or other passages which allow the drilling fluid to flow into the formations. Once the drilling fluid circulation is lost as a result of the drilling fluid entering a subterranean formation by way of fractures, vugs or other passages, the drilling operations must be terminated while remedial steps are taken. Also, when a subterranean zone is penetrated containing fluids at a higher pressure than the hydrostatic pressure of the drilling fluid column, such fluids, e.g., liquid hydrocarbons, flow into the wellbore causing cross-flows or underground blowouts.

Heretofore, a variety of sealing compositions have been developed and used for combatting lost circulation, cross-flows and underground blowouts. However, when the drilling fluid is a hydrocarbon-based fluid or when the fluid cross-flows or underground blowouts are liquid hydrocarbons, such sealing compositions have often been unsuccessful due to delayed and inadequate viscosity development by the sealing compositions.

Recently, oil-based and water-based compositions for sealing subterranean zones have been developed and utilized by Halliburton Energy Services, Inc., of Duncan, Okla. The compositions are the subject matter of U.S. Pat. No. 5,913,364 issued on Jun. 22, 1999 to Sweatman, U.S. Pat. No. 6,060,434 issued on May 9, 2000 to Sweatman et al. and U.S. Pat. No. 6,167,967 issued on Jan. 2, 2001 to Sweatman. While the compositions described in the above patents are very reactive, i.e., they very quickly develop viscosity and have been utilized successfully when the drilling fluid is an aqueous fluid or the cross-flow or blowout fluid is formation water, the sealing composition is not reactive when the fluid in the wellbore is a liquid hydrocarbon fluid.

More recently, very reactive water-based sealing compositions have been developed and utilized by Halliburton Energy Services, Inc., of Duncan, Okla. which are disclosed in U.S. Pat. No. 6,258,757 issued on Jul. 10, 2001 to Sweatman et al. While the sealing compositions are effective when the drilling fluid is a hydrocarbon-based fluid or the cross-flow or blowout fluid is a liquid hydrocarbon fluid and form relatively stiff unpumpable masses when placed and reacted, there are lost circulation, cross-flow and blowout situations which require even greater resistance to flow and compressive strength in order to contain liquid hydrocarbon fluids.

Thus, there are continuing needs for improved lost circulation, cross-flow or blowout sealing compositions which are very reactive and form high strength masses which have compressive strengths when placed and reacted with liquid hydrocarbons.

SUMMARY OF THE INVENTION

The present invention provides reactive water-based cement compositions for sealing liquid hydrocarbon-containing subterranean zones and methods of utilizing the cement compositions which overcome the deficiencies of the prior art and meet the needs described above. The compositions and methods are particularly suitable for sealing subterranean lost circulation zones containing liquid hydrocarbon-based drilling fluids, e.g., oil external-water internal emulsions known as inverted emulsions as well as subterranean zones containing liquid hydrocarbon cross-flows or blowouts.

The water-based cement compositions of this invention for sealing liquid hydrocarbon-containing subterranean zones thereby preventing the uncontrolled flow of liquid hydrocarbons into or from the zones are basically comprised of water, a hydraulic cement, and organophillic clay, a hydratable gelling agent and a water soluble alkaline source, preferably sodium carbonate. When the sealing compositions of this invention contact liquid hydrocarbons, the compositions immediately react to form a high viscosity semi-rigid sealing mass which develops compressive strength.

The methods of this invention for sealing a subterranean zone to prevent the uncontrolled flow of liquid hydrocarbons into or from the zone basically comprise the steps of providing a subterranean zone sealing composition of this invention as described above and then introducing the sealing composition into the zone whereby the zone is sealed and the flow of liquid hydrocarbons into or from the zone is terminated.

The objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost. In addition to drilling fluid lost circulation zones, zones containing pressurized fluids can be encountered which cause formation fluid cross-flows or underground blowouts. Heretofore, sealing compositions have been developed and used successfully for sealing aqueous drilling fluid lost circulation zones and aqueous formation fluid cross-flows and blowouts. However, when the drilling fluid flowing into a lost circulation zone is a liquid hydrocarbon-based fluid, e.g., an oil external-water internal emulsion, or when formation fluid cross-flows or blowouts are liquid hydrocarbons, the heretofore utilized sealing compositions have often been unsuccessful in sealing the lost circulation zones, cross-flow zones or blowout zones.

By the present invention, compositions for sealing subterranean zones to prevent the uncontrolled flow of liquid hydrocarbons into or from the zones are provided. The sealing compositions are basically comprised of water, a hydraulic cement, an organophillic clay, a hydratable gelling agent and a water soluble alkaline source such as sodium hydroxide, sodium aluminate or sodium carbonate, preferably sodium carbonate. The organophillic clay instantaneously reacts with liquid hydrocarbons in the wellbore to form a high viscosity, semi-rigid sealing mass. The gellation and/or hydration of the hydraulic cement by the water is accelerated by the alkaline source in the compositions to quickly provide flow resistance and compressive strength to the compositions. The hydratable gelling agent is present in the compositions to maintain the solids in suspension in the compositions.

The water, in addition to hydrating the hydraulic cement, is present in a quantity sufficient to produce a pumpable slurry. The water can be from any source provided it does not contain compounds that adversely affect the components in the sealing compositions. The water can be fresh water or salt water. The term "salt water" is used herein to mean unsaturated salt solutions and saturated salt solutions including brines and sea water. Generally, the water is present in an amount in the range of from about 15% to about 55% by weight of the compositions, more preferably in the range of from about 25% to about 35%.

A variety of hydraulic cements can be utilized in accordance with this invention including those comprised of calcium, aluminum, silicon, oxygen and/or sulfur which set and harden by reaction with water. Such hydraulic cements include Portland cements, pozzolana cements, gypsum cements, aluminous cements, silica cements and slag cements. The cements can be of conventional particle sizes or they can be of ultra-fine particle sizes. Portland cements are generally preferred for use in accordance with this invention. Portland cements of the types defined and described in *API Specification For Materials And Testing For Well Cements*, API Specification 10, 5$^{th}$ Ed., dated Jul. 1, 1990, of the American Petroleum Institute are particularly suitable. Preferred such API Portland cements include classes A, B, C, G and H. The hydraulic cement used is included in the sealing compositions of this invention in an amount in the range of from about 25% to about 75% by weight of the compositions, more preferably in an amount of from about 35% to about 45%.

While various organophillic clays can be utilized, an alkyl quatemary ammonium bentonite clay is preferred. A particularly suitable alkyl quatemary ammonium bentonite clay for use in accordance with this invention is commercially available from Southern Products, Inc., of Gonzales, Tex., under the trade designation "CLAYTONE-II™". The organophillic clay utilized is generally present in the compositions of this invention m an amount in the range of from about 20% to about 60% by weight of the compositions, more preferably from about 30% to about 40%.

A variety of hydratable gelling agents can be utilized in accordance with the present invention. Preferred such hydratable gelling agents which yield high viscosities upon hydration include one or more of guar gum and guar derivatives such as hydroxypropylguar and carboxymethylguar, cellulose derivatives such as hydroxyethylcellulose, carboxymethylcellulose and carboxymethylhydroxyethyl-cellulose, locust bean gum, carragenan gum, xanthan gum and welan gum. Of these, welan gum is preferred. The hydratable gelling agent or agents used are included in the sealing compositions of this invention in an amount in the range of from about 0.1% to about 1% by weight of the compositions, more preferably from about 0.1% to about 0.5%.

The viscosities of the gelling agents when hydrated in the sealing composition water can be increased by combining one or more crosslinking agents with the gelled solution. Examples of crosslinking agents which can be utilized are multivalent metal salts or compounds which are capable of releasing the metal ions in an aqueous solution. Examples of such multivalent metal ions are chromium, zirconium, antimony, titanium, iron (ferrous or fenic), zinc or aluminum. When used, a crosslinking agent as described above is included in the sealing compositions of this invention in an amount in the range of from about 0.1% to about 3% by weight of the compositions, more preferably from about 0.1% to about 1%.

The water soluble alkaline source, preferably sodium hydroxide, sodium aluminate or sodium carbonate, and more preferably sodium carbonate, functions as a pH buffer and gelation and/or set accelerating agent for the hydraulic cement in the sealing compositions and is generally present in the sealing compositions in an amount in the range of from about 1% to about 15% by weight of the compositions, more preferably from about 3% to about 10%.

In order to provide an acid solution removable water insoluble bridging agent in the sealing compositions to bridge over permeable portions of the walls of zones being sealed, particulate calcium carbonate can be included in the sealing compositions. When used, the particulate calcium carbonate is included in the compositions in an amount in the range of from about 5% to about 40% by weight of the compositions.

In order to facilitate the dispersal of particulate solid materials in the sealing compositions, e.g., the hydraulic cement and the organophillic clay, a dispersing agent (surfactant) can be included in the compositions. While a variety of dispersing agents can be utilized, preferred dispersing agents are the condensation reaction product of acetone, formaldehyde and sodium sulfite, the condensation reaction product of sodium naphthalene sulfonate and formaldehyde, and sodium-N-methyl-N-oleyltaurine mixed with sulfate liquor. Of these, the condensation reaction product of acetone, formaldehyde and sodium sulfite is most preferred. When used, the dispersing agent is included in the compositions of this invention in an amount in the range of from about 0.1% to about 2% by weight of the compositions, more preferably from about 0.3% to about 0.7%.

A variety of other components can be included in the sealing compositions of this invention including, but not limited to, cement composition set retarders, fluid loss control additives, fillers, defoamers, silicas and the like.

The sealing compositions of this invention can also be foamed with nitrogen or other suitable gas in the presence of a foaming agent and foam stabilizer for reducing the densities of the compositions, preventing fluid loss and aiding in the diversion of the compositions into the zones to be sealed.

A preferred composition of this invention for sealing a subterranean zone to prevent the uncontrolled flow of liquid hydrocarbons into or from the zone comprises: water present in an amount in the range of from about 20% to about 45% by weight of the composition; a hydraulic cement present in an amount in the range of from about 25% to about 70% by weight of the composition; an organophillic clay present in an amount in the range of from about 25% to about 55% by weight of the composition; a hydratable gelling agent present in an amount in the range of from about 0.1% to about 0.8% by weight of the composition; and sodium carbonate present in an amount in the range of from about 1% to about 15% by weight of said composition.

A more preferred sealing composition of this invention for sealing a subterranean zone to prevent the uncontrolled flow of liquid hydrocarbons into or from the zone comprises: water present from about 25% to about 35% by weight of solids in the composition; Portland cement present in an amount in the range of from about 35% to about 45% by weight of the composition; an alkyl quaternary ammonium bentonite clay present in an amount in the range of from about 30% to about 40% by weight of the composition; welan gum present in an amount in the range of from about 0.2% to about 0.5% by weight of the composition; and sodium carbonate present in an amount in the range of from about 4% to about 7% by weight of the composition.

As previously mentioned, the above composition can include particulate calcium carbonate, a dispersing agent and other cement composition additives.

The methods of this invention for sealing a subterranean zone to prevent the uncontrolled flow of liquid hydrocarbons into or from the zone are comprised of the steps of: providing a subterranean zone sealing composition comprised of water, a hydraulic cement, an organophillic clay, a hydratable gelling agent and a water soluble alkaline source, preferably sodium carbonate; and introducing the sealing composition into the zone.

In order to further illustrate the compositions and methods of the present invention, the following example is given.

EXAMPLE

Three sealing compositions of this invention were prepared. The first consisted of fresh water, API Class G Portland cement, calcium carbonate bridging agent and organophillic clay. The second and third compositions consisted of fresh water, API Class G Portland cement, calcium carbonate bridging agent, organophillic clay, welan gum, sodium carbonate and a dispersing agent comprised of acetone, formaldehyde and sodium sulfite.

Each of the sealing compositions were reacted with equal volume amounts of kerosene, and the reaction times required for the mixtures to form semi-rigid, moldable consistencies were determined. The amounts of the various components in percent by weight of the sealing compositions and the results of the tests are given in the Table below.

TABLE

Reaction Times of Sealing Compositions When Contacted With Kerosene

| Sealing Composition No. | Water, % by weight[1] | Cement, % by weight | Bridging Agent, % by weight | Organophillic Clay[2], % by weight | Welan Gum, % by weight | Sodium Carbonate, % by weight | Dispersing Agent, % by weight | Reaction Time at 130° F. |
|---|---|---|---|---|---|---|---|---|
| 1 | 45 | 26 | 13.9 | 15.1 | — | — | — | >20 min. |
| 2 | 45 | 25.91 | 13.9 | 12.8 | 0.12 | 2.09 | 0.18 | 8 min. |
| 3 | 44.2 | 21.0 | 10.5 | 18.8 | 0.17 | 3.07 | 2.35 | <15 sec. |

[1] % by weight of the sealing composition
[2] alkyl quaternary ammonium bentonite clay From the Table it can be seen that the sealing compositions of this invention react very rapidly upon contact with hydrocarbons to form semi-rigid moldable sealing masses.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

What is claimed is:

1. A method of sealing a subterranean zone to prevent the uncontrolled flow of liquid hydrocarbons into or from the zone comprising the steps of:

providing a subterranean zone sealing composition comprising water, a hydraulic cement, an organophillic clay, a hydratable gelling agent and a water soluble alkaline source wherein said water soluble alkaline source is selected from the group consisting of sodium hydroxide, sodium aluminate and sodium carbonate and is present in said composition in an amount in the range of from about 1% to about 15% by weight of said composition; and introducing said sealing composition into said zone.

2. The method of claim 1 wherein said water is selected from the group consisting of fresh water and salt water and is present in an amount in the range of from about 15% to about 55% by weight of said composition.

3. The method of claim 1 wherein said hydraulic cement is Portland cement and is present in an amount in the range of from about 25% to about 75% by weight of said composition.

4. A method of sealing a subterranean zone to prevent the uncontrolled flow of liquid hydrocarbons into or from the zone comprising the steps of:

providing a subterranean zone sealing composition comprising water, a hydraulic cement, an organophillic clay, a hydratable gelling agent and a water soluble alkaline source, wherein said organophillic clay is an alkyl quaternary ammonium bentonite clay and is present in an amount in the range of from about 30% to about 40% by weight of said composition; and introducing said sealing composition into said zone.

5. A method of sealing a subterranean zone to prevent the uncontrolled flow of liquid hydrocarbons into or from the zone comprising the steps of:

providing a subterranean zone sealing composition comprising water, a hydraulic cement, an organophillic clay, a hydratable gelling agent and a water soluble alkaline source, wherein said hydratable gelling agent is welan gum and is present in an amount in the range of from about 0.1% to about 1% by weight of said composition; and introducing said sealing composition into said zone.

6. The method of claim 1 wherein said composition further comprises particulate calcium carbonate present in an amount in the range of from about 5% to about 40% by weight of said composition.

7. The method of claim 1 wherein said composition further comprises a dispersing agent present in an amount in the range of from about 0.1% to about 2% by weight of said composition.

8. A method of sealing a subterranean zone to prevent the uncontrolled flow of liquid hydrocarbons into or from the zone comprising the steps of:

providing a subterranean zone sealing composition comprising water, a hydraulic cement, an organophillic clay, a hydratable gelling agent, and a water soluble alkaline source, and a dispersing agent wherein said dispersing agent is the condensation reaction product of acetone, formaldehyde and sodium sulfite and is present in an amount in the range of from about 0.1% to about 2% by weight of said composition; and introducing said sealing composition into said zone.

* * * * *